US011915873B2

(12) United States Patent
Yializis

(10) Patent No.: US 11,915,873 B2
(45) Date of Patent: *Feb. 27, 2024

(54) POLYMERIC MONOLITHIC CAPACITOR

(71) Applicant: POLYCHARGE AMERICA, INC., Tucson, AZ (US)

(72) Inventor: Angelo Yializis, Tucson, AZ (US)

(73) Assignee: POLYCHARGE AMERICA, INC., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,743

(22) Filed: Jun. 5, 2023

(65) Prior Publication Data

US 2023/0307183 A1    Sep. 28, 2023

Related U.S. Application Data

(63) Continuation-in-part of application No. 16/752,886, filed on Jan. 27, 2020, now Pat. No. 11,715,599, (Continued)

(51) Int. Cl.
*H01G 4/14* (2006.01)
*H01G 4/12* (2006.01)
(Continued)

(52) U.S. Cl.
CPC .......... *H01G 4/14* (2013.01); *C08F 122/14* (2013.01); *H01G 4/005* (2013.01); *H01G 4/129* (2013.01);
(Continued)

(58) Field of Classification Search
CPC .......... H01G 4/232; H01G 4/14; H01G 4/005; H01G 4/129; H01G 4/30; H01G 4/304; H01G 4/008; C08F 122/14
(Continued)

(56) References Cited

U.S. PATENT DOCUMENTS

2015/0235766 A1* 8/2015 Nishiyama ............... H01G 4/30
361/301.4

FOREIGN PATENT DOCUMENTS

WO    WO-2016136411 A1 * 9/2016 ............. H01G 4/008

\* cited by examiner

*Primary Examiner* — Arun Ramaswamy
(74) *Attorney, Agent, or Firm* — Quarles & Brady LLP; Yakov S. Sidorin

(57) ABSTRACT

Prismatic polymer monolithic capacitor structure that includes multiple interleaving radiation-cured polymer dielectric layers and metal layers. Method for fabrication of same. The chemical composition of polymer dielectric and the electrode resistivity parameters are chosen to maximize the capacitor self-healing properties and energy density, and to assure the stability of the capacitance and dissipation factor over the operating temperature range. The termination electrode that extends beyond the active capacitor area and beyond the polymer dielectric layers has a thickness larger than that used industrially to provide resistance to thermo-mechanical stress. The glass transition temperature of the polymer dielectric is specifically chosen to avoid mechanical relaxation from occurring in the operating temperature range, which prevents high moisture permeation (otherwise increasing a dissipation factor and electrode corrosion) into the structure. The geometry and shape of the capacitor are appropriately controlled to minimize losses when the capacitor is exposed to pulse and alternating currents.

11 Claims, 11 Drawing Sheets

Related U.S. Application Data which is a continuation-in-part of application No. 16/716,957, filed on Dec. 17, 2019, now abandoned, which is a continuation-in-part of application No. 16/035,475, filed on Jul. 13, 2018, now abandoned, which is a continuation-in-part of application No. 15/625,282, filed on Jun. 16, 2017, now Pat. No. 10,102,974, which is a continuation-in-part of application No. 15/483,780, filed on Apr. 10, 2017, now Pat. No. 10,347,422, which is a continuation of application No. 14/668,787, filed on Mar. 25, 2015, now Pat. No. 9,711,286.

(51) Int. Cl.
*H01G 4/30* (2006.01)
*H01G 4/005* (2006.01)
*H01G 4/232* (2006.01)
*C08F 122/14* (2006.01)

(52) U.S. Cl.
CPC ............ *H01G 4/232* (2013.01); *H01G 4/30* (2013.01); *H01G 4/304* (2013.01)

(58) Field of Classification Search
USPC ............ 361/303, 306.3, 301.4, 321.1, 321.3
See application file for complete search history.

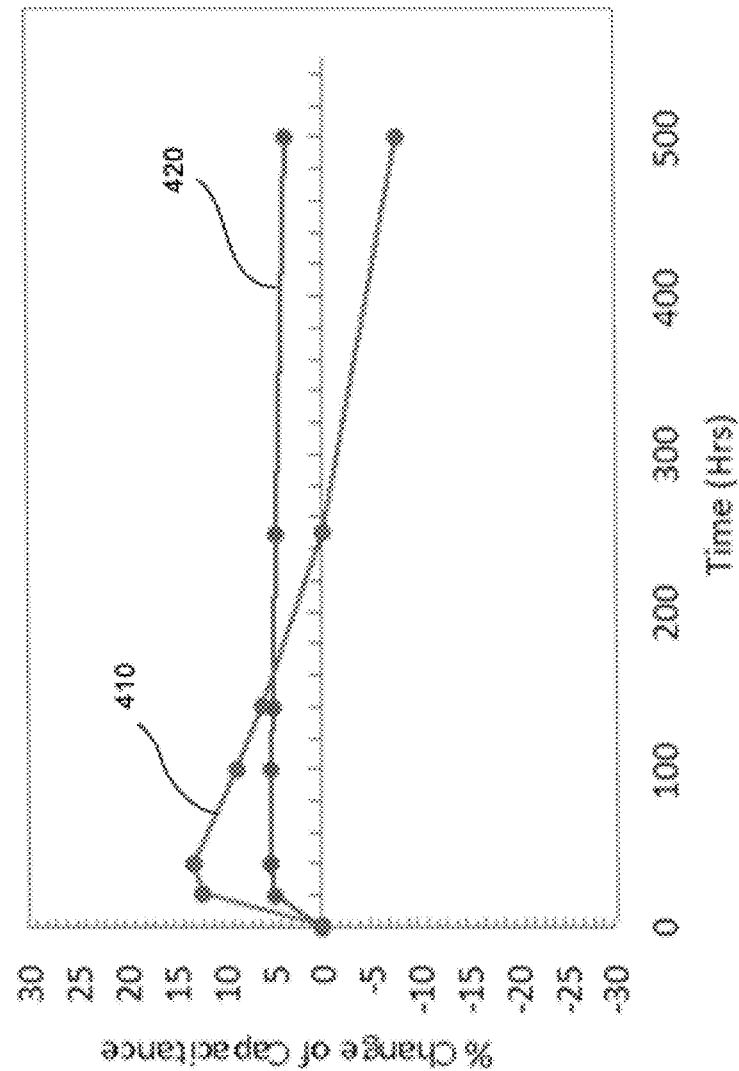

POLYMERIC MONOLITHIC CAPACITOR

CROSS-REFERENCE TO RELATED APPLICATIONS

This application is a continuation-in-part of the U.S. patent application Ser. No. 16/752,886 filed on Jan. 27, 2020 and now published as US 2020/0161049, which is a continuation in part of the U.S. patent application Ser. No. 16/716,957 filed on Dec. 17, 2019 and now abandoned, which is a continuation-in-part of the U.S. patent application Ser. No. 16/035,475 filed on Jul. 13, 2018 and now abandoned, which in turn is a continuation-in-part of the U.S. patent application Ser. No. 15/625,282, filed on Jun. 16, 2017 (now U.S. Pat. No. 10,102,974), which in turn is a continuation-in-part of U.S. patent application Ser. No. 15/483,780, filed on Apr. 10, 2017 (now U.S. Pat. No. 10,347,422), which is a continuation of U.S. patent application Ser. No. 14/668,787 filed on Mar. 25, 2015 (now U.S. Pat. No. 9,711,286). The disclosure of each of the above-mentioned applications is incorporated by reference herein.

TECHNICAL FIELD

The present invention relates generally to polymeric monolithic capacitors and, in particular, to capacitors produced using a non-thermoplastic submicron thick polymer dielectric, chemically configured to maximize self-healing and minimize moisture absorption, along with aluminum metal electrodes configured in a unique way to maximize capacitor life and resistance to degradation in extreme thermomechanical environments generated by ambient temperature and thermal loads due to high ripple currents.

RELATED ART

A polymeric monolithic capacitor (PMC) has a polymer dielectric and metallized electrodes, which structure in principle resembles that of a metallized film capacitor (MFC). MFCs are generally produced by utilizing an extruded thermoplastic polymer film dielectric that is metallized to form electrodes, then slit into bobbins that are wound in pairs to form a round capacitor roll or stacked to form a capacitor. In contrast, PMCs are produced in a one-step process in a vacuum chamber, where the polymer dielectric is formed with radiation curing of a liquid monomer layer.

A property of self-healing is an advantage of MFC capacitors, when compared to other capacitor technologies such as electrolytic, ceramic and polymer dielectric capacitors with aluminum foil electrodes. For example, a self-healing capability is accomplished or achieved by combining a relatively low melting point electrode with high conductivity (such as that made from aluminum and zinc) with patterned electrodes, which provide a fuse-like action when a dielectric breakdown occurs (see, for example, US Publication No. 2014/0347780, U.S. Pat. No. 6,040,038A, European Patent No. 0438344A1 and U.S. Pat. No. 7,027,286B2). Thin electrodes that have higher resistance also improve self-healing by reducing the energy dumped into a short and by facilitating the fusing action by reducing the energy required to melt and evaporate the electrode material around the breakdown site (see, for example, US Publication No. 2004/0232465A1). A major limitation of MFC capacitors is that the film must be thick enough for adequate uniformity and strength to be further handled for metallization, slitting, and winding into capacitors.

In stark contradistinction to the MFC, the PMC capacitor is produced in a vacuum by forming thousands of submicron-thick (less than one micron in thickness) polymer dielectric layers and metallized electrode layers using a single-process step that does not require handling of the metallized dielectrics. The lack of air between the layers, due to the vacuum environment used during production, and interlayer bonding turns the resulting structure into a substantially monolithic structure. The high-speed vacuum deposition process of monomer materials to produce thin polymer dielectrics in the vacuum and PMC capacitor technology was originally developed to overcome the thickness limitations of MFC dielectrics (see, for example, U.S. Pat. Nos. 4,842,893 and 5,018,048). The individual polymer dielectric layers in a PMC capacitor structure are pinhole free, and the overall structure is not touched or brought in contact with anything or exposed to air during the process of manufacture until and after a stack of thousands of polymer/metal layers has been already formed (including protective layers on the bottom and top surface of the stack). As a result, the polymer dielectric layers of the PMC structure can be formed to be as much as 20-100 times thinner that common polymer film dielectrics. This advantage, combined with a wide range of physical and dielectric properties of the PMC structure, results in volumetrically-efficient capacitors that can be used in applications traditionally served by other capacitor technologies (such as, for example, MFCs, electrolytic, and Ceramic Multilayer Capacitors (MLCs)).

Higher voltage applications that require low-loss dielectrics and self-healing properties are usually served with metallized polypropylene (PP) film capacitors, as long as the capacitor temperature does not exceed about 105° C. As the voltage requirement is reduced, so is the thickness of the PP film. However, the degree to which the thickness of the PP film can be reduced is limited by the film-manufacturing process, and the resulting thickness of PP films is typically no less than about two microns. This limits the voltage at which such a film capacitor can be efficiently used to about 300-450 VDC. Therefore, lower voltage applications (such as those specified at 25V-50V) that require large capacitance and small size cannot use PP film capacitors. Such applications will typically utilize MLCs that are not self-healing, or electrolytic capacitors that have other limitations, such as high dissipation factor (DF) and high Equivalent Series Resistance (ESR).

Some applications that are addressed by or served with the use of PMCs include DC-link capacitors, for example, used in inverters of hybrid and electric vehicles. Such capacitors have capacitance of the order of 100 s of microfarads and are used to minimize ripple current, voltage fluctuations, and to suppress voltage/current transients. Key characteristics of such DC-link capacitors used in voltage-sourced inverters of electric drive vehicles include self-healing properties (to assure a benign failure mode), an ability to withstand high-ripple currents, low dissipation factor (DF), high capacitance, and high operating temperature. The list of these requirements effectively excludes the use of electrolytic capacitors and MLCs. Metallized PP capacitors that are almost exclusively used in such DC-link applications have an operating temperature limited to 105° C. with significant derating in voltage, ripple current and capacitor lifetime and, furthermore, PP capacitors are relatively large and costly. Therefore, there remains a need—at least in the automotive industry—to reduce DC-link capacitor size and to extend the capacitor's upper operating temperature to at least 125° C. and preferably as high as 140° C., or even higher.

Since its inception (see for example U.S. Pat. Nos. 4,842,893, 4,954,371, 5,032,461 and 5,018,048), the PMC technology has undergone several improvements targeted toward producing mainly low-capacitance, low-voltage (typically less than 100 V) surface-mounted capacitor chips. Such improvements include methods to segment the electrodes, improved bond strength between the layers to minimize delamination during solder reflow, and various polymer chemistry, process and equipment improvements (see, for example, JP 2003303735A, JP 2000195751A, JP 3185260B2, JP 4226002B2, JP 2007180199A, U.S. Pat. No. 9,947,477B2, US Patent Publication No. 2009/0308532 and U.S. Pat. No. 6,195,249B1).

More recently, the PMC technology was expanded and focused on high-voltage capacitors that combine improvements in the range of polymer chemistry to assure good self-healing properties with electrode design to maximize PMC energy density and current-carrying capacity (see, e.g., U.S. Pat. Nos. 9,711,286 and 10,347,422). Since new power semiconductor devices are now operating at higher temperatures and frequencies, the heat load to the capacitors is increased, thereby imposing additional constraints on the operating conditions of a given capacitor. Accordingly, beyond producing high-voltage and high-energy-density PMCs for higher temperature and higher current applications, there remains a need for capacitors to reliably and repeatedly satisfy and pass a series of thermomechanical tests without significant degradation in performance. This invention addresses further improvements to the structure of PMCs aimed to maximize capacitor life and resistance to degradation when parts are exposed to high thermomechanical stress.

SUMMARY OF THE INVENTION

Embodiments of the invention provide a metallized polymer capacitor formed in the vacuum, which capacitor includes: polymer dielectric layers stacked with metallized electrodes (with at least one of said metallized electrodes having a first electrode portion in an active capacitor area, and a second electrode portion in a capacitor termination area that extends beyond the active capacitor area and beyond a polymer dielectric layer of the capacitor). The second electrode portion has a sheet resistance that is lower than 100 mOhm per square and preferably lower than 50 mOhm per square. In one implementation, at least one of these metallized electrodes may be configured to have the first electrode portion with first thickness dimensioned to effectuate a self-healing process, and the second electrode portion having a second thickness dimensioned to maximize mechanical strength and minimize electrical resistivity of the capacitor termination.

Embodiments of the invention additionally provide a metallized polymer capacitor formed in the vacuum, which capacitor includes at least one polymer dielectric layer that has a thickness smaller than one micrometer, and aluminum-metallized electrodes with a first electrode portion in an active capacitor area and a second electrode portion in a capacitor termination area. Here, the second electrode portion extends beyond the active capacitor area and beyond a polymer dielectric layer and has a second sheet resistance lower than 100 mOhm per square. Alternatively or in addition, a material of said polymer dielectric layer is configured to have a chemical structure with a hydrogen-to-carbon ratio of at least 1.0 and an oxygen-to-carbon ratio of at least 0.1 and/or a glass transition temperature greater than 100° C. In a specific case, any implementation of such capacitor may be configured to have the first electrode portion with a first sheet resistance value lower than 100 Ohm per square and the second electrode portion to extend beyond the active capacitor area and beyond a polymer dielectric layer and has a second sheet resistance lower than 100 mOhm per square.

Embodiments additionally provide a high-voltage metallized polymer capacitor formed in the vacuum. Such capacitor includes multiple internal sections that are electrically-connected in series; and metallized electrodes in each of the multiple internal sections. Here, at least one of these metallized electrodes has a first electrode portion in an active capacitor area and a second electrode portion in a capacitor termination area of the capacitor, and the second electrode portion extends beyond the active capacitor area and beyond the polymer dielectric layer and has a sheet resistance value lower than 100 mOhm per square. Alternatively or in addition, the first electrode portion may be configured to have a corresponding sheet resistance value lower than 100 Ohm per square.

In one specific case, the embodiments provide a self-healing metallized polymer capacitor formed in the vacuum. Such capacitor includes non-thermoplastic polymer dielectric layers stacked with metallized electrodes to form a non-wound layer stack devoid of air gaps between constituent layers. At least one of such metallized electrodes is configured to have a first electrode portion and a second electrode portion. The first electrode portion has a first thickness limited by first and second surfaces of the at least one of the metallized electrodes (here, the first electrode portion is located with the first thickness extending throughout an active capacitor area and laminated between and in contact with a first surface of a first polymer dielectric layer and a second surface of a second polymer dielectric layer of said polymer dielectric layers of the layer stack). The second electrode portion has a second thickness limited by a third surface of the at least one of the metallized electrodes and the second surface of the at least one of the metallized electrodes. The second electrode portion is located such that its second thickness is present both (i) between the first and second polymer dielectric layers such that the third surface of the at least one of the metallized electrodes is in direct physical contact with the first surface of the first polymer dielectric layer along the second electrode portion, and such that the second surface of the at least one of the metallized electrode is in direct physical contact with the second surface of the second polymer dielectric layer along the second electrode portion, and (ii) outside the first and second polymer dielectric layers such that at least one of the third surface and the second surface of the at least one of the metallized electrodes is in contact, along the second electrode portion, with a material different from a material of the first and second polymer dielectric layers. Typically, the material that is in contact with the second electrode portion that extends beyond the polymer dielectric layers is a conductive material such as a metal and/or a conductive polymer-metal composite.

The thickness of the second electrode portion (the second thickness) is chosen to be greater than the thickness of the first electrode portion (the first thickness) primarily to increase the mechanical strength of the second electrode portion when a metal coating and/or a conductive polymer-metal composite is applied to the unsupported second electrode portion that extends beyond the polymer dielectric layers. The larger thickness of the second electrode portion in addition to providing resistance to mechanical damage, results in a sheet resistance that is lower than that of the first electrode portion, which minimizes the electrical resistivity of the capacitor's termination. This increases the ability of the capacitor to curry high continuous and pulse currents, which in combination with the increased mechanical strength it results in a greater reliability of the capacitor termination under different application conditions.

BRIEF DESCRIPTION OF THE DRAWINGS

The disclosure presented in the Detailed Description section of the present application will be better understood in conjunction with the following generally not-to-scale Drawings, of which:

FIG. 7 shows plots representing time-dependent percent change in capacitance of two different PMCs exposed to a temperature and humidity test under applied voltage FIGS. 8A, 8B, 8C, and 8D provide schematic diagrams illustrating embodiments of PMCs.

DETAILED DESCRIPTION

Figure 1B:
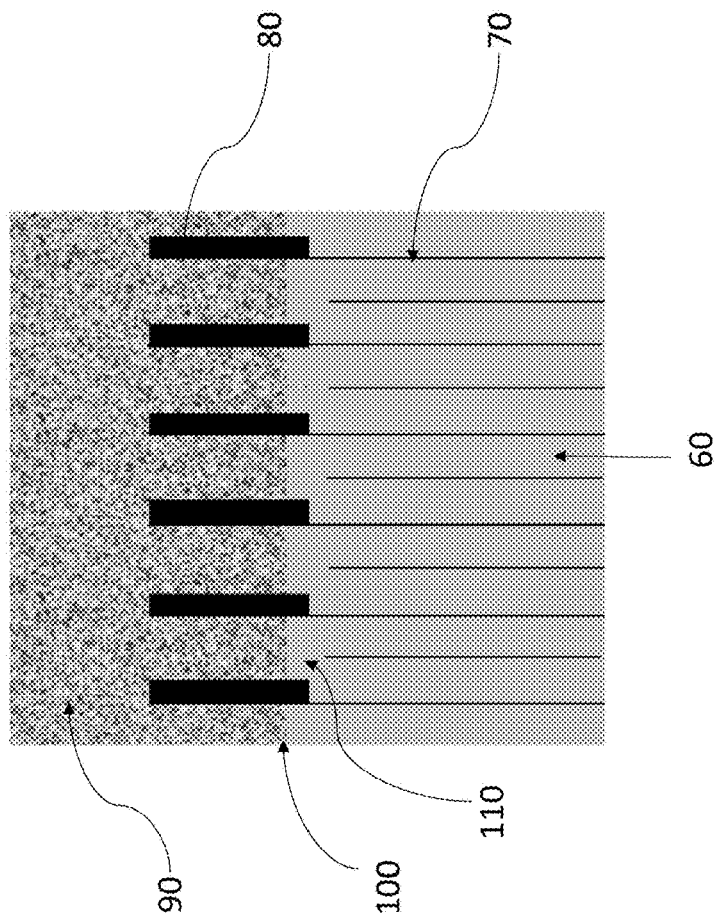
FIGS. 1A and 1B are schematic diagrams of the termination of a conventional MFC and an embodiment of PMC, respectively.

This invention is directed at fabrication of a polymeric monolithic capacitor possessing self-healing properties that prevent catastrophic failure of the capacitor (and that may result, instead, only in a benign failure mode), high temperature stability, resistance to degradation in high-temperature and high-humidity environments, and ability to handle high-ripple currents, and extreme thermomechanical environments.

The term "polymer monolithic capacitor" (PMC) is used to describe a capacitor that originates as a multilayer composite (or "mother capacitor") material produced or formed around a rotating drum in the form of thousands of polymer dielectric and electrode layers. The mother capacitor material is removed from the drum and is processed into individual capacitors, via a series of process steps that include pressing the mother capacitor material, segmentation of the pressed material into individual capacitors, etching of the electrodes at the cut edges to prevent flashover, and termination steps that include plasma ashing of the polymer at the termination edge to reveal the aluminum electrodes and arc-spraying a metal over the exposed aluminum electrodes to connect the thousands of electrode layers and form a capacitor with two sets of electrodes.

A PMC is produced using a highly cross-linked, non-thermoplastic polymer dielectric, in contrast to wound metallized polymer film capacitors (MFCs), which comprise thermoplastic polymer materials (that is, materials capable of repeatedly becoming pliable when heated or reheated, and solid when cooled). In DC-Link applications, capacitors can be exposed to high ambient temperatures which, when combined with additional heating due to high frequency ripple currents (I), can cause a thermoplastic dielectric to soften. This softening degrades the contact between the nanothick metallized electrode layer and the arc-sprayed electrode, which results in a higher Equivalent Series Resistance (ESR), that further increases the degree of heating ($I^2*ESR$). This heating limits both the performance boundaries of a wound film capacitor that utilizes a low-temperature polymer (such as PP), as well as the capacitor life. PMCs, on the other hand, comprise a highly cross-linked non-thermoplastic polymer material that does not melt, but slowly degrades at, for example, temperatures above 300° C. Furthermore, as discussed in more detail below, it is important that a glass transition temperature of the material of certain embodiments is well above any temperature that results in the above-mentioned heating effects—this characteristic eliminates the possibility of a phase change which, although not comparable to a softening point, assures that there is absolutely no movement in the polymer dielectric (other than expansion forces) that can compromise the contact resistance between the metallized electrodes and the arc sprayed layer.

The power semiconductor technology, used to "chop" the voltage in an inverter circuit that utilizes a DC-link capacitor, is continuously evolving. The current trend is to use higher voltage semiconductors that improve the inverter efficiency. Thus far, the majority of inverter circuits were using silicon-based Insulated Gate Bipolar Transistors (IGBTs). More recently, many inverter designs have started to utilize Metal Oxide Semiconductor Field-Effect Transistors (MOSFETs) made with the use of silicon carbide, which operate at high voltages and higher frequencies. Gallium Nitride based MOSFETs are also potential candidates for many high power and high voltage inverter applications. These new semiconductor switching devices, offer higher electrical efficiency, higher power density, higher dynamic response, and higher switching frequency, as compared with the previous generation. Given that these devices operate at higher voltage and frequency, the corresponding inverter circuit requires a DC-link capacitor that is typically smaller than the ones used in a lower-frequency IGBT circuit. Operation at higher frequency increases current in the capacitor. Typically, the capacitance associated with the new devices may be about 50-65% of that used in a lower frequency circuit, while the current may be equal, or even higher than that of lower frequency circuits. The use of a capacitor of smaller size will require a smaller number of capacitor layers, which will lead to an increase in the capacitor ESR. Given that the main heat dissipation factor is proportional to $I^2*ESR$, higher current and higher ESR can dramatically increase the heat load and the operating temperature of the capacitor. This operational change imposes a severe thermal limitation on conventional metallized film capacitors, which can lead to capacitor failures and/or a shorter capacitor life.

PMCs—given their high temperature characteristics—have no problem handling the heat load. Although the PMCs will operate without failure at higher temperatures, the higher heat load will force the capacitor to expand and contract significantly more than would happen otherwise, which can impose additional mechanical stress on the termination. Thus, one objective of this invention is to address issues that arise from increased heat dissipation and thermomechanical effects to improve capacitor performance.

The terms "polymer dielectric" and "polymer dielectric layers" may be used interchangeably to describe a layer of polymer, which is produced by flash evaporation of a radiation-curable monomer material that is vaporized and condensed on a rotating drum, and then cured with electron beam or UV radiation.

The terms "cure", "polymerization" and "cross-linking" may be used interchangeably to refer to the process by which a condensed monomer material is converted into a polymer dielectric material.

The terms "metal electrodes" and "aluminum electrodes" may be used interchangeably to define the polymer monolithic capacitor electrodes, of which aluminum electrodes are but one example.

The term "vacuum" as in a "PMC capacitor formed in the vacuum" means a partial atmosphere that is typically in the pressure range of about few torr to about $10^{-6}$ torr.

While generally the terms "termination electrode" (termination of an electrode, or a similar term) and "heavy edge electrode" (or a similar term) may be used interchangeably to describe or refer to a section of the capacitor electrode located outside the active capacitor area, this section is structured differently in different types of capacitors Indeed, in a conventional MFC, for example, the heavy edge electrode is deposited on the polymer film and is supported by this film when the heavy-edge portion is arc-sprayed to contact or connect all the capacitor windings. While in a PMC the termination electrodes are deposited on the polymer dielectric as well, the polymer dielectric is then removed at the edge to expose the metal electrodes, which are then in turn connected by an arc spray process.

The terms "self-healing", "self-healing event" and "clearing" may be used interchangeably, to denote a process occurring during a breakdown of the capacitor's dielectric, as a result of which the electrical short between the two electrodes causes a current flow that melts the thin metal electrodes around the location of the short (like a fuse), thereby isolating the location of the fault, protecting the capacitor component from being destroyed by the catastrophic breakdown.

The terms "plasma ashing" and "plasma etch" refer to a process where a polymer material in the presence of an oxidative plasma is "ashed" or burned away as a result of conversion of the polymer material into low molecular weight gaseous products. This process is used to remove polymer at the edges of the monolithic capacitors to expose the metal electrodes so that the electrodes can be shorted together with an appropriate coating to form a capacitor termination.

The term "electrode passivation" refers to exposure of metal electrodes (and, specifically, aluminum metal electrodes) to oxygen-containing plasma immediately after having been deposited, to form an oxide layer thereon—such an $Al_2O_3$ oxide layer, for example, which is the most stable and corrosion resistant aluminum oxide. If not passivated in this manner then, when the multilayer capacitor is exposed to humidity, a hydrated aluminum oxide is formed ($Al_2O_3 \cdot$ ($H_2O$)), which is not as protective as $Al_2O_3$, thereby leading to rapid electrode corrosion. Another form of passivation that is adopted for PMCs is to react the aluminum electrodes with a corrosion inhibitor, which will minimize access of the metal electrode by moisture.

The terms "stable capacitor operation", "stable capacitance", and "stable dissipation factor" are used to define a capacitor in which no sudden changes of capacitance or dissipation factor occur in the operating temperature range of the capacitor, and especially at higher temperatures. For example, a capacitor designed to operate at 125° C. or higher is considered to have stable capacitance if the capacitance is not reduced by more than 10% and/or not increased by more than 20% at the maximum operating temperature from that at 25° C. Similarly, the dissipation factor of a stable capacitor (a stable dissipation factor) at the maximum operating temperature can be lower than that at 25° C., but it does not increase more than about 20% at the maximum operating temperature.

The idea of the present invention stems from the realization that specific solutions to shortcomings in operational characteristics of existing capacitor structures can be achieved through unique combinations of the chemical structure of the polymer dielectric material, its physical properties, constrains in the thickness and/or resistivity of the metallized electrodes, treatment of the electrodes, and choosing specific capacitor shapes that enhance electrical performance.

In particular, the answer to the problem of widening a temperature range of operation of the PMC and achieving the stable operation at temperatures as least as high as 125° C. or higher (for example, 140° C.) is provided by devising a polymer dielectric material the properties of which ensure that the dissipation factor (DF) of the capacitor is stable throughout the operating temperature range by selecting a polymer dielectric that has a glass transition temperature, Tg, that is higher than the maximum operating temperature. It was discovered that if the Tg of a polymer is between 25° C. and the maximum operating temperature, then at the Tg the polymer undergoes a mechanical relaxation, which increases the dissipation factor and can also affect the dielectric constant. Furthermore, at temperatures above the Tg the polymer absorbs moisture, which has detrimental effects both on the dissipation factor and electrode corrosion. Accordingly, the problem of increasing the range of operating temperatures across which the dissipation factor remains stable is addressed, by the present invention, by formulating a polymer dielectric material with Tg that is significantly higher than the maximum operating temperature. In addition to the moisture absorption by the polymer dielectric, when the ambient temperature exceeds the Tg, the coefficient of thermal expansion (TCE) increases significantly. Such increase can have an effect on the mechanical strength and durability of the capacitor termination. When capacitors are operated at extreme temperature conditions which imposes thermomechanical stress on the capacitor, in combination with a mechanical relaxation (that takes place in the dielectric at temperatures above Tg) and moisture absorption by the dielectric, the performance of the capacitor can be adversely impacted, leading to capacitance loss and increase in ESR.

In addition to satisfying the Tg condition, the capacitor of choice must have the ability to self-heal in the event that a breakdown occurs. A problem of maximizing the self-healing properties of a PMC was solved by devising the chemistry of the polymer dielectric material in which the carbon in the polymer is effectively removed in the form of gases (such as CO, $CO_2$, $CH_4$, and $C_2H_6$, for example). Specifically, an effective carbon removal process has been shown possible if the monomer materials used to produce the polymer dielectric have an average hydrogen-to-carbon ratio in excess of 1 and an oxygen-to-carbon ratio in excess of 0.1.

For high temperature and high current applications, another condition that needs to be satisfied is high corrosion resistance of the capacitor electrodes, especially if the electrode comprises aluminum. Generally, an aluminum electrode (when exposed to high temperature and DC voltage in the presence of humidity) undergoes an electrochemical corrosion that reduces the area of the electrode and increases its resistivity. This problem is addressed, at least in part, by passivating the aluminum layers of the PMC structure of the current invention in line with the very deposition of these layers. It was discovered that, in addition to conventional electrode passivation by exposure to plasma, post baking of the mother capacitor material to temperatures in the range of 200° C. to 280° C. also resulted in electrode passivation. The latter form of passivation is possible by creating organometallic bonds between the aluminum electrodes and polymer dielectric, and/or a component of the polymer dielectric that acts as a corrosion inhibitor when it attaches to the aluminum surface. The acrylate monomer that is used to form the polymer dielectric contains functional groups that can (are configured to) react with the aluminum electrodes. Also, small quantities of specific functional groups can be added to the monomer formulation to maximize the function of the corrosion inhibitor. It was discovered that, at high temperature and given sufficient time, for example five to twenty four hours, such functional groups will move to the surface of the polymer layers and react with the aluminum electrodes, thereby blocking access of the aluminum by moisture.

According to one embodiment of the invention, the specific chemistries of monomer materials used to produce the polymer dielectric layer(s) are chosen to facilitate the capacitor self-healing process. In implementing the idea of the invention, PMCs were produced using a wide range of radiation-curable materials that included monomers incorporating carbon-to-carbon double bonds that brake with radiation, to cause the polymer dielectric to cross-link. In one example, such chemistries included acrylate monomers that are cured using electron beam and UV radiation. By choosing an acrylate chemistry that has high H:C and O:C atomic ratios, the self-healing properties were improved by aiding the formation of $Al_2O_3$, CO, $CO_2$, $CH_3$, $C_2H_6$ and other hydrocarbon gases that remove Al and C from the site of a breakdown of the carbon-to-carbon double bonds. The elimination of Al and C from the surface of the polymer layer as the electrodes melt back (or fuse), leads to a rapid, quick fusing action, during which a relatively small amount of current was dumped into the failure site. Such process minimizes the damage caused by the electrical short between the electrodes, thereby allowing the voltage across the capacitor electrodes to recover with minimum or no leakage current flow through the damaged dielectric layer. Indeed, in the alternative—when the surface of the polymer continues to hold a high level of carbon thereon (that is, remains "carbonized")—the fusing action will be slowed down, which leads to a greater amount energy to be disposed at the failure site in a unit of time, causing additional breakdowns of adjacent dielectric layers. If not interrupted, this process can lead to a thermal runaway failure of the capacitor. While in most cases the capacitor does not necessarily fail as a result of such failure, it nevertheless loses a significant amount of capacitance. Furthermore, if carbon is not removed adequately from the polymer surface, it causes excessive leakage current that compromises the capacitor performance. Yet another condition that needs to be satisfied for high-temperature operation of the capacitor of choice is the reduction of the heating losses in the capacitor. Current metallized film capacitors used in inverter applications can fail when high-temperature operation is combined with high ripple current, causing heating due to dissipation of power in the resistance of the electrodes. A problem of minimization of the power loss in the PMC is solved by judiciously structuring the capacitor such that a termination edge thereof is defined at the long edge surface of the PMC. In doing so, the mechanical strength of the termination edge of the PMC structured according to an embodiment of the invention is additionally increased by increasing the thickness of termination electrode layers, as discussed below in detail.

Utilization of a heavy edge is currently employed in metallized film capacitors. The thickness of the heavy edge of related art usually has a value corresponding to sheet resistance of less than 5 Ohm/square and typically in the range of 2-4 Ohm/square (and, in some applications, as low as 1-2 Ohm/square). As shown in a cross-sectional view of FIG. 1A, in a conventional metallized film capacitor two metallized polymer films 5 and 8 are wound together with a spatial offset 10 between the ends of the films. The active electrode 20 is disposed to stop short of the edge of the film 8 (thereby defining an electrode margin area 50), in order to prevent surface flash-over from the electrode 20, to the arc spray portion 40 (which, in operation of the capacitor, is at polarity opposite to that of the electrode 20). The arc spray material 40 is disposed to make contact with the heavy edge 30 of an electrode in the offset or extension area 10 (the longitudinal extent of which is typically several millimeter), and is mechanically held in place as a result of filling the space between multiple spatially-extended polymer layers of the structure. Notably, the heavy edge 30 of an electrode of related art extends from a point close to the active electrode area, to the edge of the polymer film dielectric. In high-ripple current applications, the heavy edge 30 comprises usually an additional zinc metal layer, that is deposited only in the area of the heavy edge.

PMC capacitors utilize aluminum both in the active electrode area and in the termination electrode area for higher corrosion resistance. The high-temperature polymer dielectrics of the PMC can handle higher heat of condensation of the aluminum metal without deformation and wrinkling which would be the case if a thick aluminum layer were deposited on a thin polypropylene film.

Figure 9:
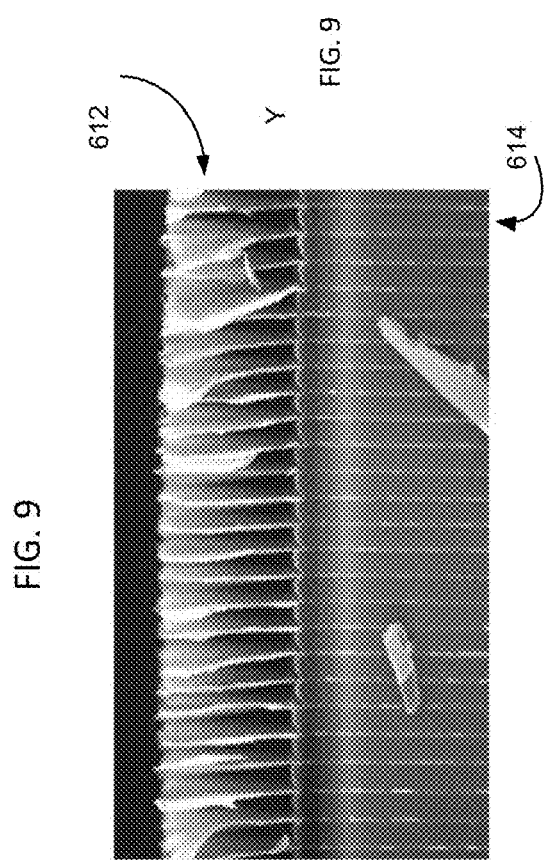
FIG. 9 shows a Scanning Electron Microscope (SEM) image of the termination electrode in a PMC.

FIG. 1B shows a schematic of the termination in a PMC (see also an SEM image in FIG. 9) of an embodiment of the invention. In this design, in advantageous counter-distinction with the structure of FIG. 1A of an MFC, the electrode termination area 80 is defined by portions of the capacitor's electrode(s) formatted to extend beyond the outermost edge or end polymer dielectric layer(s) 60, while the other portions 70 of the same electrodes are within the active area (region) of the capacitor and are laminated between and in contact with the immediately neighboring polymer dielectric layers 60. In at least one case, the polymer dielectric layers are made of a non-thermoplastic material. The thickness(es) of the portion(s) of electrodes corresponding to the capacitor's termination is greater than the thickness(es) of the portion(s) of the electrode(s) within the active area of the capacitor to at least increase mechanical strength of the termination. Optionally, the portions of the electrodes in the termination 80 are configured to have sheet resistance that is lower than that of the portions of the electrodes within the active area of the capacitor to at least minimize the electrical resistivity of the capacitor's termination and/or to increase reliability of a high-current contact provided by such termination. The arc spray material 90 engulfs or surrounds the aluminum termination area 80 of the electrodes, but does not engulf or surround any portion of the polymer dielectric layer(s) as it does in the conventional structure of FIG. 1A. Instead, the arc spray 90 of the embodiment of the invention is judiciously disposed to make contact (shown as 100) with edge(s) of the polymer dielectric layers.

Although good functional PMCs may be produced with a termination electrode having parameters in the same range as those of the metallized film capacitors (for example, with electrodes having substantially the same thickness both within and outside of the active capacitor area), we discovered that given the unique structure of PMCs, in order to maximize performance under extreme thermomechanical conditions, the termination portion(s) of the electrodes—that is, those portions that extend beyond and outside the extend of the interleaved polymetric layers and outside the active capacitor area—has to be at least at some point thick enough to provide adequate mechanical strength. In particular, portion(s) of the electrodes that are extending beyond the polymer dielectric layers (outside the active capacitor region) need to have a certain minimum mechanical strength, because they will be connected together by processes that include arc or thermal spray of a metal layer and conductive epoxy, which apply thermomechanical stresses. Notably, since such electrode portion(s) is(are) not in the capacitor's electric field, the additional thickness of these electrode portions does not affect the self healing process, thereby providing additional advantage over the PMCs of related art.

For PMCs operating in higher frequency inverter circuits the thicker termination portion(s) of the electrode(s) also results in lower ESR and thus lower heat dissipation, which in turn minimizes thermomechanical stress at the termination. This requirement is unique to the construction of PMCs according to the idea and an embodiment of the invention, because in a conventional metallized film capacitor the polymer film (on which the heavy edge is deposited, see FIG. 1A) supplies all necessary mechanical strength to withstand both the force of the arc spray during termination and the subsequent thermo-mechanical stress imposed by operating conditions in extreme environments.

Another unique element of PMCs according to the idea of the invention is the electrode margin area 110. Unlike MFCs where the margin 50, is on the order of millimeters (varies based on the capacitor voltage rating), to prevent surface flash-over that takes place on the surface of a dielectric, in embodiments of the PMCs the margin is filled with polymer dielectric which eliminates the flash-over effect, thereby allowing the margin 110 to be dimensioned at a level of a small fraction of a millimeter. Similarly, the electrode termination area 80 in a PMC, configured according to an embodiment of the invention, is of the order of micrometers, which is a small fraction of the film extension area 10 in an MFC. The combination of virtually no extension (10) and a much smaller electrode margin (110 vs 50), is an additional factor that contributes to the high energy density of PMCs.

For most demanding DC-link applications (for example, automotive inverters), capacitors have to pass thermal cycling and thermal shock tests to be certified according to various industry standards. We discovered that the optimum range for a PMC termination electrode thickness, as measured by using sheet resistivity, is well outside the range of that of conventional capacitors, by more than an order of magnitude. We found that sheet resistance of the electrode termination area should be lower than 100 mOhm and, preferably, lower than 50 mOhm, and even more preferably lower than 25 mOhm. In addition to providing increased mechanical strength, the so-dimensioned thicker aluminum layers are characterized by increased corrosion resistance as well as lower electrical resistance, which in turn leads to reduced ESR. Both of these parameters are critical for operation of a PMC capacitor at high current (I) conditions. The lower ESR reduces the $I^2*ESR$ heat load, which brings down the temperature in the termination, which in turn lowers the corrosion rate of the aluminum layer when high voltage is applied. Reduced corrosion lengthens the capacitor life as measured by capacitance loss, and increases ESR as a function of time.

Figure 2B:
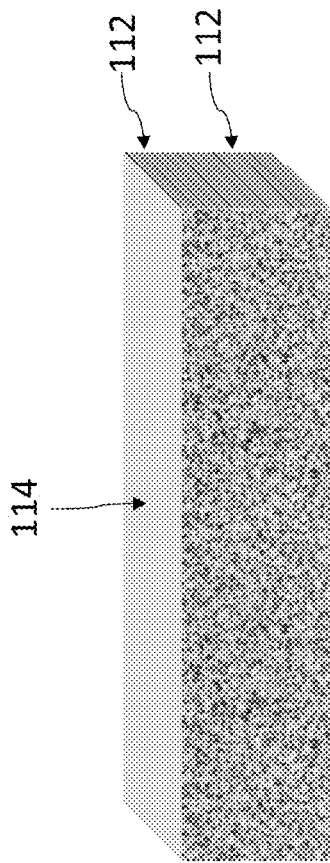
FIGS. 2A and 2B show schematically, respectively, one PMC element and multiple PMC elements that are connected in parallel using an arc spray process to form an aggregate PMC with capacitance that is larger than that of a single PMC element.
Figure 2A:
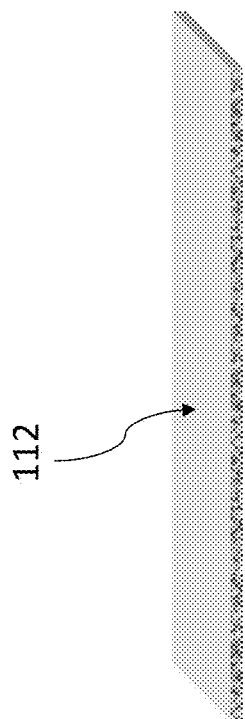

It should be noted that a PMC is produced from large sheets that are segmented into individual capacitor elements (U.S. Pat. No. 5,018,048). As shown in FIG. 2, such elements 112 can form PMCs by themselves, or multiple capacitor elements 112 can be stacked and electrically connected in parallel to produce a capacitor block 114 that has larger capacitance (in comparison to that of an individual capacitor element). In embodiment discussed below, a given PMC capacitor may be structured as a single capacitor element 112 or an aggregate capacitor 114 that includes a stack of multiple elements 112.

Figure 3A:
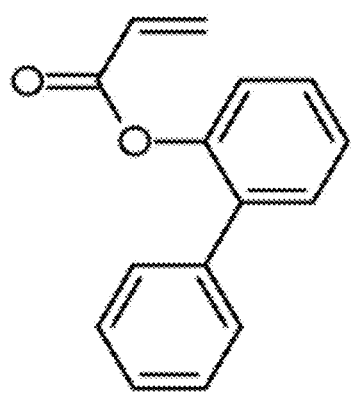
FIGS. 3A and 3B provide schematic diagrams of two monomer chains.
Figure 3B:
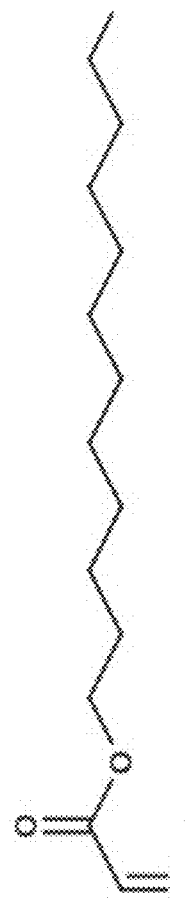

Example 1: In order to compare the self-healing properties of the PMCs made with polymers having different chemical compositions, a test was performed to determine at the leakage current through the capacitor after a large number of self-healing events. Initially, a mother capacitor material (with an area of 10 square feet) containing 2000 active capacitor layers was produced with different polymer dielectric materials, but keeping the same dielectric thickness (0.65 micrometer) and electrode resistivity (25 Ohms/square). Individual chips (each with an area of 500 mm$^2$) were segmented from the mother capacitor material and processed into capacitors. Depending on the dielectric constant, the capacitors had a capacitance in the range of 30-35 μF. At least 50-80 capacitors from every batch were exposed to a DC voltage of 300 V or greater. Exposure of such thin polymer dielectrics to voltages equal to or exceeding 300 VDC caused clearings of weak spots or defects in the capacitor's dielectric material. After exposure to the DC voltage, various capacitor parameters were measured, including capacitance, dissipation factor, equivalent series resistance (ESR), and leakage current. Capacitors with polymer dielectrics that have acceptable self-healing properties had a leakage current of less than 1 μA. Capacitors with a polymer dielectric that did not have acceptable self-healing properties, had a leakage current exceeding 50 μA. It was empirically determined that the chemistry of the radiation-curable monomers had a significant impact on leakage current generated by the self-healing events and, ultimately, on the maximum voltage that could be applied to the capacitor before the catastrophic failure occurred. For example, a capacitor with a polymer dielectric comprising 2-phenyl-phenyl acrylate (the chain for which is shown schematically in FIG. 3A) demonstrated poor self-healing properties, in stark contradistinction with a capacitor structured with the use of monomer comprising a dodecane acrylate polymer dielectric material, which also has twelve carbons in an aliphatic chain (see FIG. 3B).

The 2-phenyl-phenyl acrylate has a hydrogen-to-carbon ratio of H:C=0.8 and an oxygen-to-carbon ratio O:C of 0.13, while the dodecane acrylate is characterized by H:C=1.86 and an O:C=0.14. In general, we found that, in order for a PMC capacitor designed for a high-temperature application to withstand maximum voltage with minimal degradation, it is necessary for the monomer molecules or mixture of monomers used for formation of the polymer dielectric material of such capacitor to have a hydrogen-to-carbon ratio H:C>1 and an oxygen-to-carbon ratio O:C>0.1 and, preferably, H:C>1.2 and O:C>0.1. While it was recognized that the presence of other atoms that can lead to formation of gaseous products capable of removing carbon from the polymer surface (such as nitrogen and fluorine, for example) was also beneficial, not many related embodiments of monomers were evaluated to develop a criterion.

A parameter that is equally critical for maximizing self-healing properties is the thickness of the metallized capacitor electrodes in the active capacitor area. Since thickness measurements are extremely difficult to conduct on nanometer-size metal layers, the thickness of the aluminum electrodes is quantified by their electrical conductivity or, alternatively, sheet resistance. This correlation works well for electrodes that include highly conductive low-melting point metals (such as aluminum, aluminum alloys), two-layer electrodes (such as aluminum/zinc, aluminum/copper, zinc/silver, and others). It was empirically found that, in addition to selecting polymers that have the proper H:C and O:C ratios, the resistivity parameter(s) of the metallized electrodes needs to be within a judiciously defined range in order to maximize the self-healing properties.

It should also be noted that the better the self-healing properties, the higher the voltage (V) that can be applied to the capacitor without causing a catastrophic failure. The capacitor energy is determined by the relationship of $\frac{1}{2}*C*V^2$. Therefore, the greater the applied voltage V, for a given capacitance C, the higher the energy that one can store in a capacitor. Experimentation indicated that, in conventional wound capacitors, air-filled micro-gaps contribute to the formation of the $Al_2O_3$ as well as to the removal of carbon in the form of $CO$ and $CO_2$, which aids the self-healing process. PMCs have no air gaps; therefore, in order to maximize the self-healing properties, in addition to oxygen supplied by the polymer (as described above), the electrode resistance value needs to be greater than resistance values of the conventional wound film capacitors. However, with increase of the electrode resistance, the ESR also increases, which increases the capacitor loss in the form of heat dissipated in the electrodes ($I^2R$ where R=ESR). It was determined that, for a high ripple current application where the continuous current is high, the maximum value of sheet resistance should be limited to less than 100 Ohm/square to minimize losses and to maintain a dissipation factor smaller than about 0.02.

Example 2: PMC capacitors designed for a high current DC-link application (with 60,000 layers having a polymer dielectric chemical structure characterized by a hydrogen-to-carbon ratio of greater than 1.0 and an oxygen-to-carbon ratio greater than 0.1, glass transition temperature Tg>100° C., dielectric thickness 0.6 micro-m, and aluminum-based electrodes with a sheet resistance of 30-40 Ohm/square in the active capacitor area and less than 5 Ohm/square in the area of the heavy edge, yielded parts with dissipation factor smaller than 0.02 and a breakdown strength corresponding to breakdown voltage of less than 250 V. Three of such capacitors connected in series (internally) were used to produce a 500 μF/600 V capacitor system which was approximately three times smaller than state of the art PP capacitors with lower ESR (that is, lower $I^2R$ heating losses). At the same time, the operating temperature of the so-produced PMC capacitor system was 140° C. versus 105° C. for conventionally-used PP capacitors. This evidenced a dramatic improvement in energy density and reliability of the capacitors configured according to an embodiment of the invention for demanding automotive applications, which, in turn, also translates to and results in smaller and more efficient and lower cost inverters.

Figure 4:
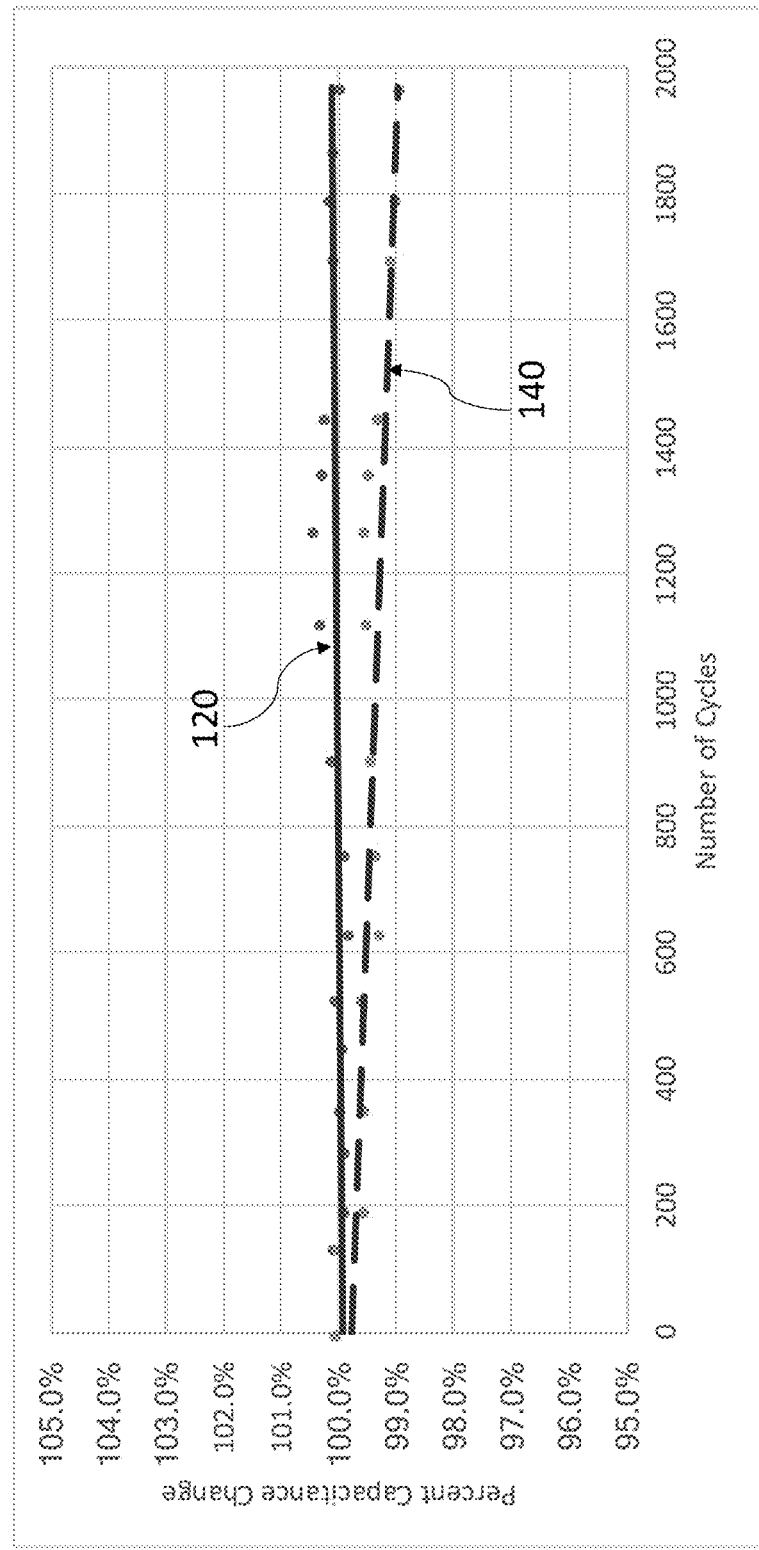
FIG. 4 includes plots illustrating a change, as a function of time during a thermal shock test, in capacitance values of the PMCs with termination electrodes having different thicknesses.

Example 3. The above Example 2 addresses PMC performance based on steady-state operating conditions of voltage and temperature. By performing additional thermo-mechanical tests, it was discovered that thicker termination electrodes with additional mechanical strength improve capacitor life. FIG. 4, shows plot representing the results of the thermal shock life test of PMCs with different termination electrode thicknesses (measured via resistivity of such terminations). The thermal shock cycle was from −40° C. to +105° C. with thirty-minute dwell time at each discrete temperature point and one minute of transition time from one temperature point to another. One group of parts, the results for which are represented by the fitting curve 120, had an average heavy edge resistivity of 250 mOhm (milliOhm) and another group of parts—represented by the fitting curve 140, had an average resistivity of 400 mOhm. The measured PMCs were individual capacitor elements (FIG. 2, 112), with a capacitance/voltage rating of (24 μF/600 V). The capacitors were not packaged in order to maximize their exposure to the thermomechanical test conditions. The test results clearly showed that the use of electrode termination with lower resistivity (or larger thickness), has a significant performance advantage.

Example 4: In another example, an 18,000 layer capacitor was produced using the same polymer dielectric chemistry as that disclosed in Example 2, but with a polymeric layer thickness of 0.2 microns, designed for lower voltage applications. We found that at lower voltages, typically in the range from about 12 VDC to about 48 VDC, the electrode resistance in the active capacitor area becomes an even more critical parameter. This is because when a breakdown occurs, a significant amount of energy is required to melt and vaporize the electrode material in order for the capacitor to self-heal. This required energy is supplied by the capacitor itself as it discharges into the short, and is proportional to the square of the voltage at which the capacitor is charged. At lower voltages, a condition can be found where the capacitor cannot efficiently self-heal if forced to undergo multiple breakdown events, leading to a high resistance short. While an obvious solution to this situation would be to have a dielectric that is thick enough at a given voltage level to avoid multiple self-healing events (and thereby avoiding a short), such solution leads to a larger capacitor with lower energy density. Contrary to such otherwise obvious solution, and in order to maximize the breakdown voltage and energy density, the 18,000 layer capacitor was produced according to an embodiment of the invention to have sheet resistance in the active capacitor area of about 60 to about 80 Ohm/square, instead of 30-40 Ohm/square that would have been used with a 0.6 μm dielectric for a higher voltage application. This solution resulted in a capacitor that could undergo multiple breakdowns without leading to a high resistance short.

In a related implementation, a capacitor similar to that of Examples 2 and 4 was made, in which the portion of the electrode(s) located outside of the active area of the capacitor has a sheet resistance value lower than that of the sheet resistance of the portion of the electrode(s) located within the active area of the capacitor to at least minimize electrical resistivity of the capacitor's termination and/or to increase reliability of a high-current contact provided by such termination.

Figure 5:
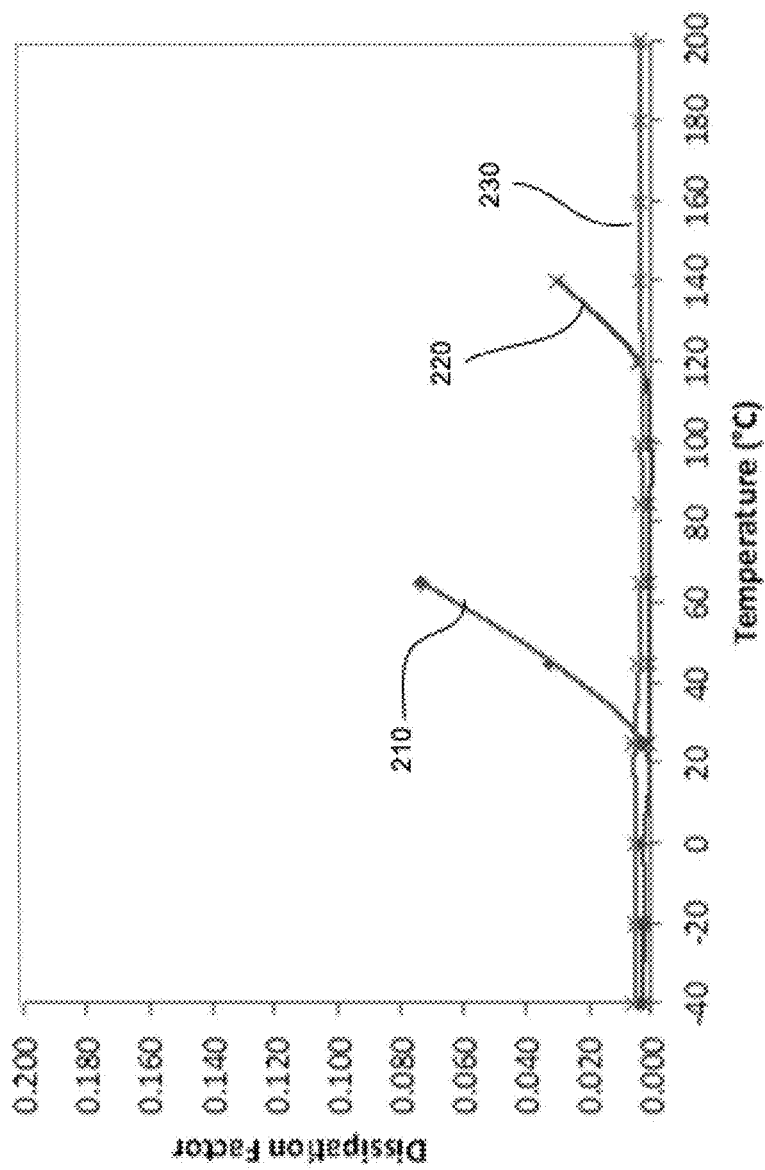
FIG. 5 shows plots representing dependencies of the dissipation factor on temperature for PMCs with different Glass Transition temperatures (Tg).

In order to address the production of a polymer monolithic capacitor capable of operating reliably at elevated temperatures (up to 125° C. and higher, for example 140 degrees), a behavior of the dielectric loss of the polymer dielectric material was considered. For a stable operation of the PMC, it is important that the dissipation factor is stable throughout the desired operating temperature range. The curves 210, 220, and 230 of FIG. 5, show dissipation factors of the three radiation cured polymer dielectrics used to produce the polymer monolithic capacitors according to an embodiment of the invention. These curves demonstrate that the DF of a capacitor can increase at various temperatures based on the chemistry of a particular polymer dielectric material. The DF of a capacitor with a polymer dielectric that includes 4-tert-butylcyclohexyl acrylate, shown by curve 210, increases sharply at about 30° C., while the DF of a capacitor with a polymer dielectric that includes dicyclopentanyl acrylate, shown by curve 220, starts to increase at about 120° C. If a capacitor is operated at temperatures where the DF trends upward, the loss will increase the capacitor temperature, which in turn will drive the capacitor to a higher temperature with an even higher DF, which in turn will further increase thermal losses. This process eventually can lead to a thermal runaway failure of the PMC. As a skilled artisan will readily recognize, the data on dissipation factor as a function of temperature for most radiation-cured polymers is either not known or not published. Accordingly, to implement an idea of the present invention, tens of monomers with different monomer formulations were converted into capacitor dielectrics, and measured for DF as a function of temperature up to temperatures of 160° C. and greater. It was unexpectedly determined that for most radiation-cured polymers, the increase in DF coincides with the glass transition temperature (Tg). Unlike the DF, the Tg of many radiation-curable polymers is typically reported by the monomer producers and, therefore, as a result of such empirical determination, it was realized that the Tg can be used to select monomers which, when used to form polymer dielectric materials during the process of fabrication of a PMC, can result in a capacitor with a dissipation factor that is substantially the same at elevated temperatures. For example, as shown by curve 230 of FIG. 5, the use of a polymer dielectric material including a mixture of Tricyclodecane Dimethanol Diacrylate and triallyl isocyanurate (both of which have a Tg>200° C.) results in a capacitor with the DF that is operationally stable up to 200° C.

In addition to limiting the DF stability, the value of Tg imposes another limitation on the selection of the polymer dielectric for a PMC. Specifically, it was determined that the use of polymers with lower Tg values leads to absorption of moisture by the capacitor. That is, if the capacitor is operated in ambient conditions of humidity and temperature that is lower than the Tg, the dielectric layers will absorb ambient moisture which, in turn, impacts the stability of capacitance of the PMC. While polymer films such as polypropylene have Tg that is lower than room temperature, they do not absorb water due to the low polarity of the polypropylene chemistry. In comparison, acrylate and other radiation-curable chemistries incorporate higher polarity bonds (such as CO, CN, CF, for example), which may be advantageous because they result in higher polarity chemistry that leads to a higher dielectric constant and, therefore, an increase in energy storage by the resulting PMC. However, the same high polarity chemistry also leads to an increase of moisture absorption. The moisture absorption is minimal until the Tg is reached. Beyond the Tg temperature, the molecular relaxation that occurs at Tg can dramatically increase moisture absorption.

Figure 6:
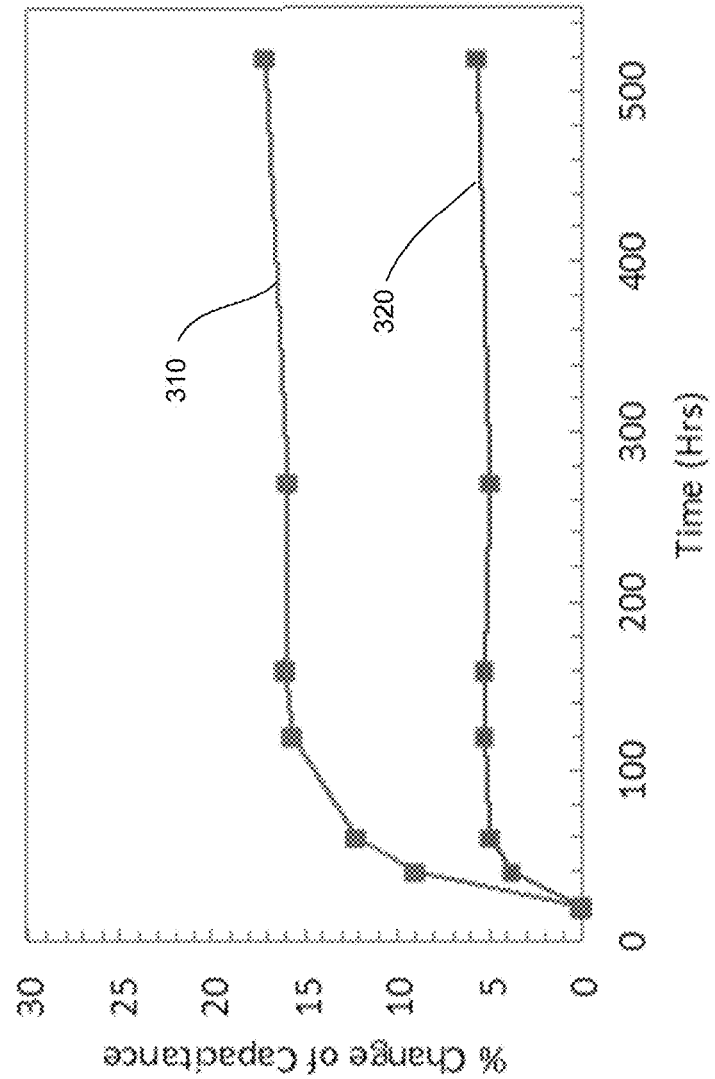
FIG. 6 shows plots representing time-dependent percent change in capacitance of two different PMCs, exposed to a temperature/humidity test.

The absorption of moisture causes both short-term and long-term reliability issues with the performance of the capacitors performance. Short term, the capacitance value increases due to the high dielectric constant of water and, longer term, the water corrodes the thin capacitor electrodes leading to permanent capacitance loss. This is demonstrated in FIGS. 6 and 7. FIG. 6 depicts plots of percent change in capacitance as a function of time for two types of PMC capacitors. These PMCs have 2000 capacitor layers each but are constructed with two different polymer dielectric materials that have the same dielectric constant k=3.2. Curve 310 of FIG. 6 represents a first polymer dielectric with a $T_{g1}$ of 43° C., while curve 320 represents a second polymer dielectric with a $T_{g2}$ of 100° C. The capacitors were exposed to the ambient environment characterized by 60° C. and 90% relative humidity (RH) for 500 hours without voltage bias, and were intentionally unpackaged to allow the maximum effect of moisture on the capacitor dielectric. Furthermore, small capacitors chips (with areas of about 12 mm$^2$) were used, so that any moisture penetrating into the dielectric layers at the edges of the capacitor would have a more pronounced effect on capacitance. Water has a dielectric constant in the range of k=75-80 and, when absorbed by a polymer dielectric with a k of 3.2, it increases the dielectric constant of the polymer dielectric, thereby resulting in an increase of capacitance. As follows from FIG. 6, at a test temperature of 60° C. (which is higher than $T_{g1}$), the value of capacitance of the PMC built with the first polymer dielectric increases significantly and more than that corresponding to the PMC built with the second polymer dielectric.

As part of the test, capacitors fabricated with the first and second polymer dielectrics were exposed to the same conditions of temperature and humidity but with the addition of DC voltage bias. The illustration of FIG. 7 shows that the first PMC capacitor (employing the dielectric with the lower $T_{g1}$, represented by curve 410) after a relatively short period of time following the beginning of the exposure started to lose capacitance, while the capacitance of the second PMC (utilizing the second polymer dielectric with higher $T_{g2}$, curve 420) remained comparably unchanged. The application of DC voltage triggers a corrosion mechanism in the aluminum metallized capacitor electrodes which reduces the electrode surface area. Therefore, in order to devise a PMC that would perform reliably (in contradistinction with a conventional capacitor that employs a dielectric material such as polypropylene) at extreme temperatures, a radiation-cured dielectric material used to produce a PMC according to an embodiment of the invention should have both a DF that is substantially unchanged across the range of operating temperatures as well as a Tg value that is equal or greater than the desired operating temperature.

Very few radiation-curable monomers were found to result in polymers that combine both low DF and Tg with a value higher than 125° C. (which is a target temperature for DC-link capacitors for automotive applications). Most of such high Tg monomers have either cycloaliphatic chemistry or they have more than two double bonds. Trifunctional monomers such as tris (2-hydroxy ethyl) isocyanurate triacrylate and triallyl isocyanurate (the behavior of which is represented by curve 230 of FIG. 5) have Tg>125° C. and DF<0.01 that is substantially unchanged up to this temperature. Cycloaliphatic monomers, which include an adamantane (adamantyl) structure resembling that of diamond (such as 2-methyl-2-adamantyl acrylate, 1,3-adamantanediol diacrylate, and tricyclodecane dimethanol diacrylate, for example) also have Tg>125° C. Various formulations of polymers designed to maximize the dielectric constant, self-healing properties, and lower DF can include certain materials that have Tg<125° C. as long as the Tg of the formulated polymer dielectric is greater than 125° C. and preferably greater than 140° C., given that a PMC operating at 125° C. can reach temperatures of 140° C. or even higher due to the presence of high ripple currents and related thermal losses.

At the same time, it was discovered that certain monomers that result in highly cross-linked polymer dielectrics (at least two acrylate groups), such as for example hexane diol diacrylate with Tg=41° C., trimethyl propane triacrylate with Tg=62° C., and dimethyl propane tetracrylate with Tg=96° C., also have a stable DF at temperatures exceeding 125° C. due to the molecular weight and crosslinking nature of the monomer. When producing PMC capacitors with such polymer materials we found that when such capacitors were life tested at 125° C. with the application of DC voltage, there was high moisture absorption which rapidly degraded the capacitor properties. Therefore, the measurement of the temperature-dependent behavior of the DF alone is not adequate to determine if a polymer has a Tg that will make it usable for this invention. To determine the Tg of a polymer dielectric material, 2000 layers of polymer-only stacks were produced using the same radiation curing conditions as those used to produce a PMC. The complex modulus of the polymer dielectric was then measured as a function of temperature using a Dynamic Mechanical Analysis (DMA) methodology to determine the Tg. Therefore, the process of selecting a monomer formulation that leads to a high performance high temperature polymer dielectric is elaborate and not obvious to someone skilled in the art.

According to the idea of the invention, the geometry of a polymer monolithic capacitor is devised such as to reliably service a DC-link application that combines high ripple currents and high ambient temperatures. The related art teaches that, in order to increase the capacitor energy density of polymer monolithic capacitors, it is important to have capacitor electrodes with resistivity corresponding to the sheet resistance values in the range of 10 Ohms/square to 500 Ohms/square). The equivalent series resistance (ESR) of the capacitor, which depends on the sheet resistance, contributes to capacitor losses. While lower values of the ESR can be easily attained by increasing the conductivity of the electrodes (which can be done by increasing electrode thickness, for example), the thicker electrodes result in poor self-healing properties. The approach chosen for the purposes of the present disclosure is rooted, at least in part, in a judicious choice of the capacitor's geometry and is devoid of an overall increase of the thickness of the electrodes along their lengths (that is, across the capacitor length).

Figure 8A:
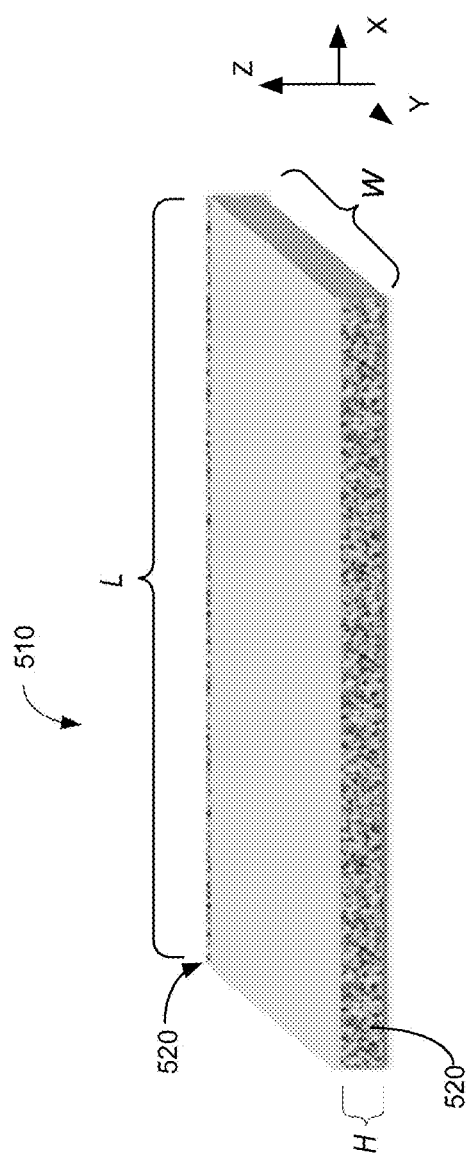
Figure 8B:
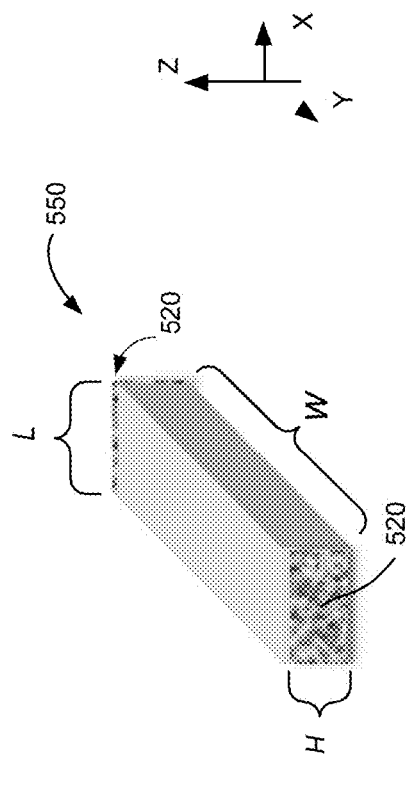
Figure 8D:
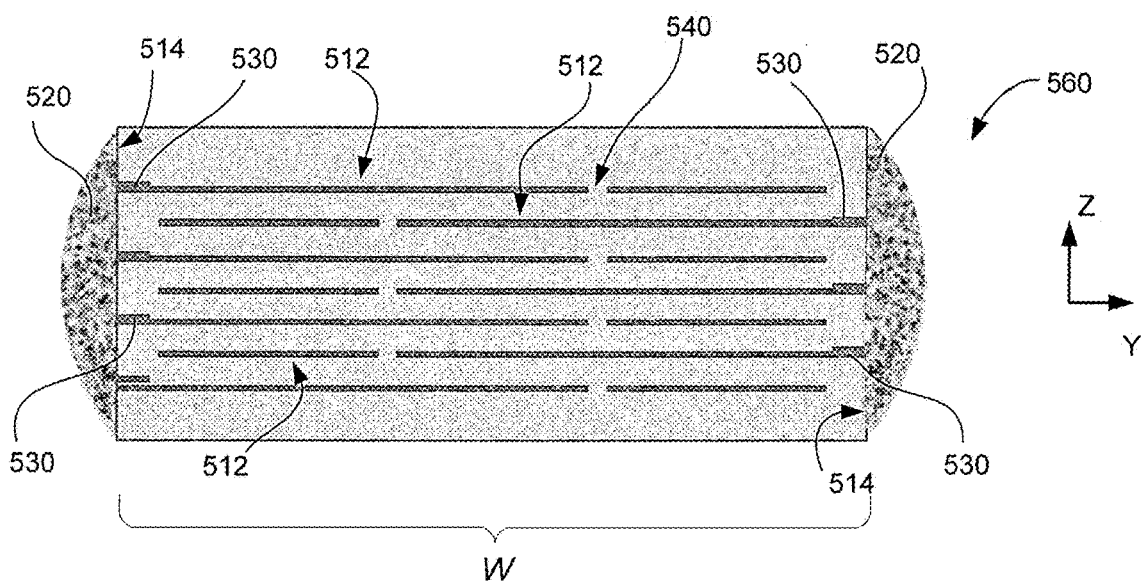
Figure 8C:
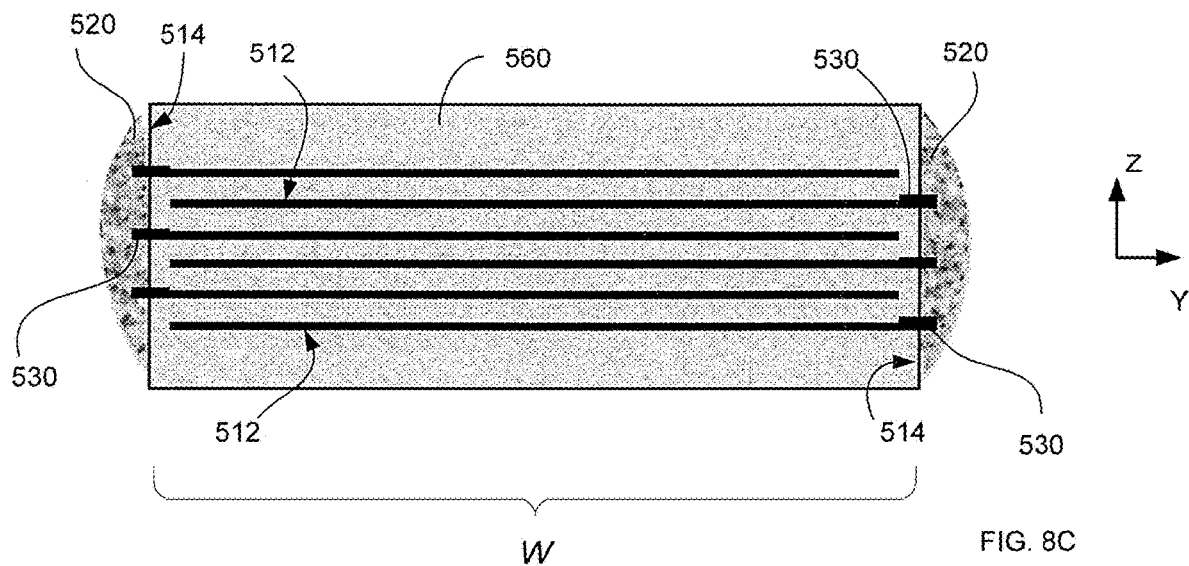

If one increases the electrode resistivity, for example, to maximize the self-healing properties, heating losses via $I^2R$ (where R denotes the equivalent series resistance (ESR) and I denotes the AC current) will increase the capacitor temperature. Such increased temperature, e.g., when combined with high ambient temperatures, can lead to the capacitor failure, mainly by accelerating the rate of electrode corrosion. We determined that to minimize the thermal effects of the current while also maintaining the electrodes with higher levels of sheet resistance, which aids the self-healing process, the geometry of the capacitor must be chosen to reduce the capacitor's ESR as much as it is practical. This goal can be achieved by shaping the capacitor's body to be elongated, extended on one direction to a greater degree than in another, transverse direction, and establishing the termination structure at the long side of so-shaped capacitor. The higher the target value of the sheet resistance of the electrodes, the higher the ratio of the extent of the termination edge to that of the other edge has to be. For example, a 2000 layer capacitor shaped as a square (when viewed perpendicularly to the capacitor's layers) and that has electrodes with the sheet resistance of 500 Ohms/square has an ESR (at a resonance frequency) of approximately 25 mOhm. If the capacitor is five times as long along the termination side as it is wide, however, the ESR value drops to approximately five times to 5 mOhm, and so do the heating losses. FIGS. 8A, 8B, and 8C provide corresponding illustrations, of which FIGS. 8A, 8B show examples of two PMCs 510, 550 and FIG. 8C illustrates a not-to-scale cross-section of any of the capacitors 510, 550. Each of the capacitors 510, 550 includes thousands of capacitor layers 512 shown in FIG. 8C. Multiple layers 512 are connected at the termination facets 514 of the structures by termination coating 520, such as electric arc spray, which shorts the electrode layers together and establishes a contact point to charge and discharge the capacitor. In order to improve the mechanical strength and reduce the contact resistance of the structure of a PMC, the electrodes 512 are configured to have heavy edges (thicker outer electrode portions) 530 outside the active capacitor area and in proximity to the termination coating 520, so that the thicker edge-portion of an individual electrode layer does not affect the capacitor self-healing properties. The inner portions of the electrodes 512—those within the active are of the capacitor—have thicknesses that are lower than thicknesses of the heavy edges 530.

Here, generally, an inner portion of a given electrode 512 is located with its corresponding thickness extending throughout an active capacitor area and laminated between and in contact with a first surface of a first polymer dielectric layer and a second surface of a second polymer dielectric layer that are in immediate contact with the inner portion of the electrode 512. An outer portion of the given electrode 512 (the one corresponding to the heavy edge 530 of the termination portion of the capacitor) is located such that its corresponding thickness is present present both (i) between the same first and second polymer dielectric layers, such that the third surface of the given electrode 512 is in direct physical contact with the first surface of the first polymer dielectric layer along the outer portion of the given electrode 512 while the second surface of the given electrode 512 is in direct physical contact with the second surface of the second polymer dielectric layer along the outer portion of the given electrode 512, and (ii) outside the first and second polymer dielectric layers such that at least one of the third surface and the second surface of the given electrode 512 is in contact, along the outer portion of the given electrode 512, with a material different from a material of the first and second polymer dielectric layers, It was discovered that in order to maximize the capacitor self-healing process (which requires the use of electrodes with higher sheet resistance values while also minimizing the impact of the higher sheet resistance on the ESR), the general geometry and the ratio L/W of the PMC devised according to an embodiment of the invention should follow that of the prismatic-shaped capacitor 510 of FIG. 8A where L/W≥1 and preferably L/W>2.

It has been known that decreasing the thickness of PMC capacitor dielectrics increases breakdown strength (see U.S. Pat. No. 6,092,269). However, a high voltage capacitor with a rating in the range of 500 VDC to 1000 VDC requires a thick dielectric, typically in the range of 2.5 μm to 5.0 μm. Therefore, in order maximize the energy density of a PMC capacitor, multiple very thin dielectric capacitors connected in series can be utilized rather than a single capacitor with a thicker dielectric. One approach is to produce multiple lower voltage PMC capacitors, as shown in FIG. 8C, and connect them in series by means of external electrodes. An alternate approach can be adapted from one that has been used by both MFC and MLC technologies (see for example U.S. Pat. No. 6,760,215 and US Publication No. 2013/0329334), but not yet for PMCs. This approach includes using an internal series design as shown in FIG. 8D, in which a PMC 560 is shown to contain three internal sections of electrodes in series 540. A result of this approach is that thinner dielectrics that have higher energy density can be used, thus maximizing the performance of the PMC. For example, based on the above requirement for high L/W ratios, the internal series design eliminates external electrode connections and effectively increases the L/W ratio of each of the three sub-capacitor structures by a factor of three, for example, compared to the case shown in FIG. 8C, which is devoid of such serial connections.

We have also discovered that the internal series sections (which were originally used to take advantage of the higher breakdown strength of the submicron-thick dielectric layers of the capacitor) serve another key function that is unique to the discussed embodiment of PMCs. It is well known that when aluminum oxide is formed on the surface of aluminum metal either by using DC anodization or an AC process, the aluminum oxide thickness is defined as a function of the applied electric field/voltage. In a polymer metallized capacitor with aluminum electrodes, the corrosion of the aluminum electrodes is driven mainly by voltage and the presence of an electrolyte in the vicinity of the electrode (typically $H_2O$, which yields $OH^-$ and $H^+$). Although in a wet anodization process the field that creates the aluminum oxide is formed between the metal electrode and the outer surface of the oxide that is in contact with the liquid electrolyte, in a PMC (that has a dielectric thickness for example of about 600 nm) the voltage more than the field is the dominant driver of corrosion. The thickness of aluminum electrode(s) in the active area of the capacitor may vary, for example, from about 5 nm to about 15 nm. The aluminum oxide has an initial aluminum oxide thickness of about 1 nm to 2 nm, depending on the metallization process. Therefore, in an approximately 600-nm-thick dielectric (that has a dielectric constant k=3.2, for example) the field across a 2 nm-thick aluminum oxide layer (that has a dielectric constant on the order of k=7-8) will not change significantly if and when the voltage changes for example from 450 V to 500 V.

We empirically determined that conversion of aluminum to aluminum oxide, which causes loss of capacitance, initiates at the edge of the electrodes or around defects where the aluminum layer is spatially discontinuous. The reason for this is explained by the highly non-uniform electric field at the edge of 5-15 nanometer thick aluminum electrodes. At the electrode edge the formed field can be orders of magnitude higher than the uniform field across the two capacitor electrodes. Accordingly, the corrosion is driven mainly by the voltage applied to the electrode rather than field across the capacitor. In a conventional metallized capacitor, the voltage rating is usually determined by thickness of the polymer film dielectric. For example, the thinnest available polypropylene film has a thickness of about 2.0 μm. A polypropylene (PP) capacitor produced with this film for use in DC-link application is rated at an operating voltage of 450 V (600 V max). On the other hand, a PMC with the same 450V/600Vmax rating, can be produced with a polymer dielectric as thin as about 550 nm to 650 nm, using three sections internally connected in series. Therefore, each electrode of the PMC, when operating at the rated voltage, will experience a maximum voltage of 150 V (rather than 450 V for an electrode of the metallized PP capacitor). The effect, where electrode corrosion is the main capacitor failure mechanism, is unique to metallized polymer capacitors. Other capacitor technologies, including multilayer ceramics, polymer film with aluminum foil electrodes, and electrolytics, can also utilize internal series sections for various reasons, but not to prevent moisture driven electrode corrosion.

Figure 1A:
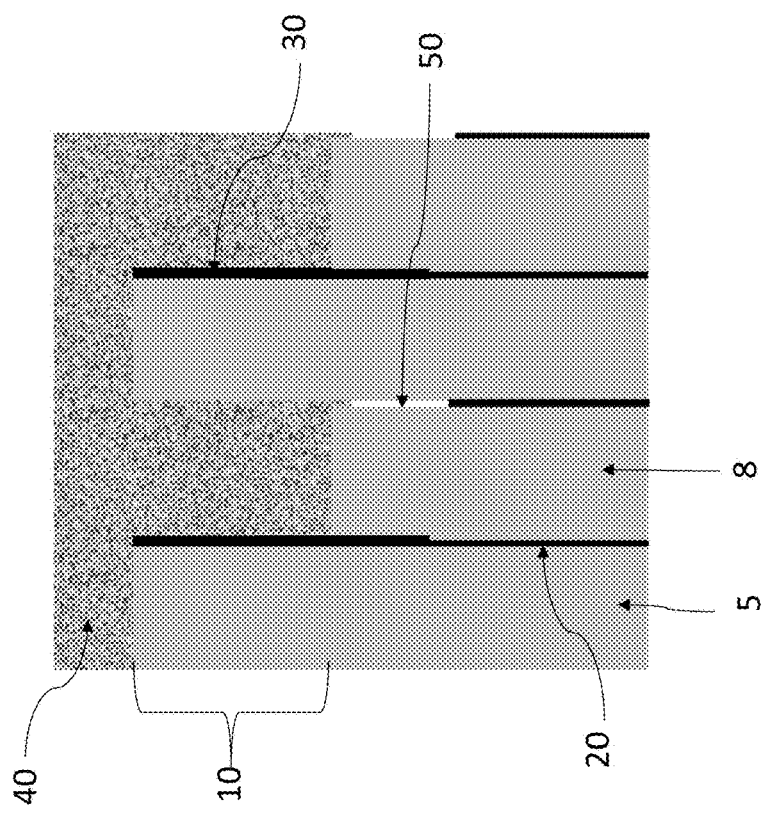

As a skilled artisan will immediately appreciate, the lowered level of voltage applied to each of the three PMCs connected in series significantly and advantageously impacts the rate of corrosion and capacitance stability, as compared to conventional situation known in the art. Embodiments of a PMC of the invention can be produced with a polymer dielectric thickness as low as 0.1 μm. Such thin dielectrics not only have superior breakdown strength, but also allow for the capacitor to be built with multiple internal series sections (sections electrically connected in series) that facilitate the process of lowering of the applied voltage per section, thereby reducing electrode corrosion and improving capacitance stability over the life of the capacitor. Although, the so-configured "internal series capacitors" may be separated by a spatial break or "gap" in the aluminum metallization, the distance between the series electrodes is very short, electrically speaking (see FIG. 8D-540), because this gap is filled with polymer dielectric material that has high breakdown strength. Therefore, the PMC energy density also benefits from the multiple series sections because the breakdown strength of the PMC dielectrics increases as the thickness is reduced well below a micrometer and—as noted above (FIG. 1B, 110), the cumulative length of gaps 540 is still significantly smaller than a higher voltage MFC margin (FIG. 1A, 50).

Figure 10:
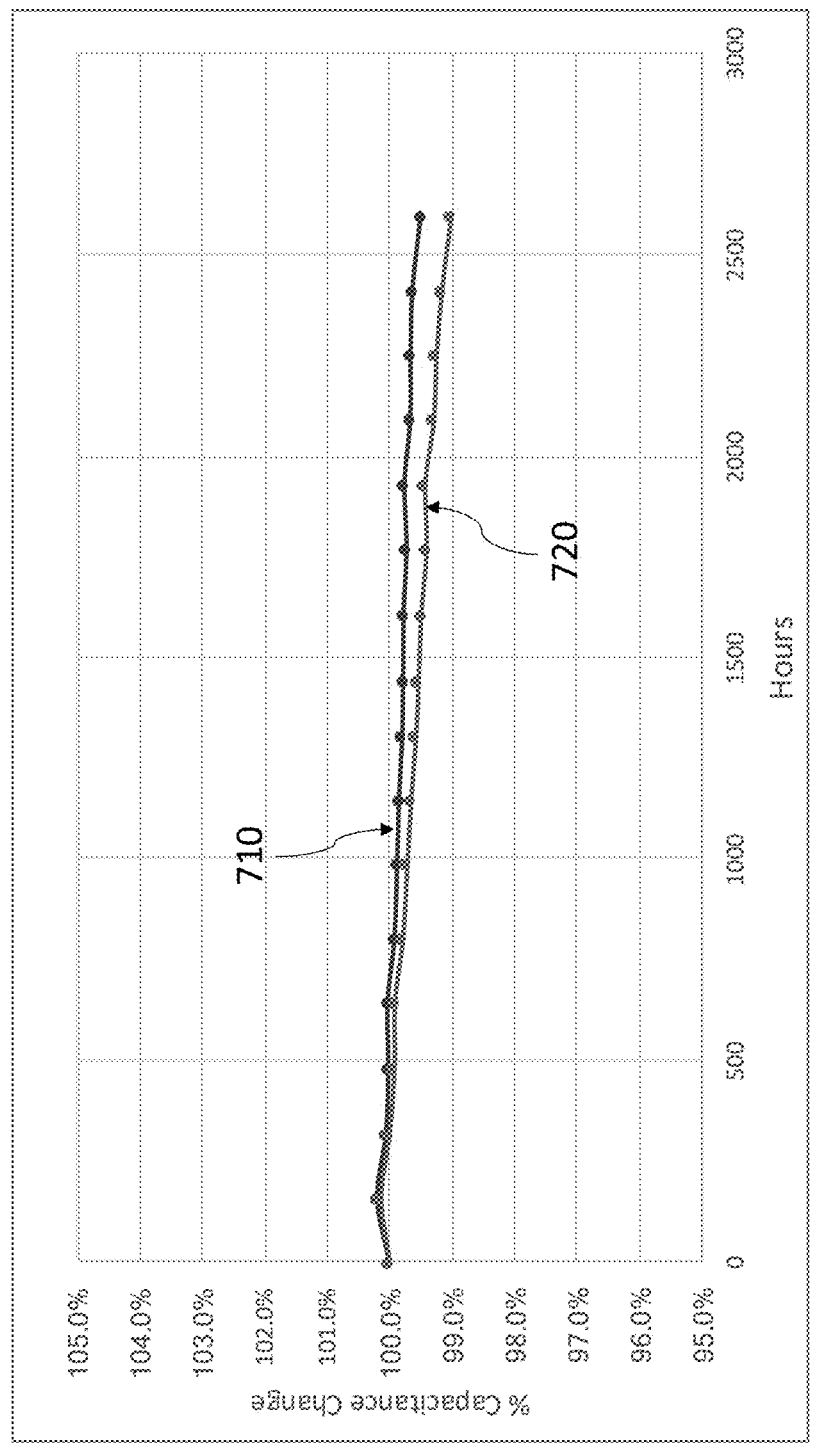
FIG. 10 shows plots representing long-term capacitance stability of PMCs with multiple internal series sections.

An example of the effect that applied voltage produces on the loss of capacitance is demonstrated in FIG. 10, which shows long-term stability of capacitance of sixteen 50 μF packaged PMCs, tested at 105° C./450 VDC (curve 710) and at 105° C./500 VDC (curve 720). These parts have three internal series sections, with a dielectric thickness on 0.6 μm. Therefore, the voltage per section was 150 V for the 450 V test and about 163.3 V for the 500 V test. As seen, while the loss in capacitance during the 500 V test is not necessarily high, it is approximately double that for the 450 V test. A person of skill will readily appreciate that this difference in performance will be reduced further if a larger number (as a non-limiting example: four) of internal series sections were used in the capacitor, each with thinner than 0.6 micron dielectric layers. Alternatively, the change in performance of the capacitor would be dramatically higher if 450 V and 500 V voltages were applied to a single PMC capacitor (not sectioned into sections connected in internal series). This consideration demonstrates a unique feature of embodiments of PMC capacitors with submicron-thick dielectrics, which feature allows higher voltage capacitors to be produce with multiple internal series, thereby reducing the corrosion rate of the aluminum electrodes (which in turn results in more temporally-stable capacitance over the life of the capacitor). The discussed finding is operationally significant, because (since the PMCs self-heal and do not typically fail catastrophically) a capacitor failure over a period of 20,000 to 100,000 hours is considered to be a drop in capacitance of 5%.

The present invention addresses a PMC containing a polymer dielectric material that possesses self-healing properties and improved life expectancy under extreme conditions of thermomechanical stress induced both by thermal shock and thermal cycling tests, as well as high ripple currents (i), which increase the capacitor temperature due to heat losses in the form of I*I*ESR. This is founded primarily on:

a. The chemical composition of the polymer dielectric as it relates to the H:C and O:C content that facilitates a superior self-healing action.

b. A polymer dielectric that is designed to maintain a stable capacitance and dissipation factor across a range of operating temperatures, such as operating temperatures of 125° C. and higher. To do this, the polymer dielectric material is characterized by a glass transition temperature (Tg) that is higher than the chosen operating temperature, contributing to a stable dissipation factor and reduced moisture absorption. The reduced moisture absorption will minimize electrode corrosion and increase the capacitor life. Furthermore, if the capacitor temperature that results from the combined ambient operating temperature and heating due to I*I*ESR, is below Tg then the increase in TCE that occurs at an operating temperature higher that Tg will not be a factor;

c. The electrode termination thickness, in addition to lowering the capacitor ESR it contributes greatly to the mechanical strength of the PMC termination. In order for PMCs to operate reliably under extreme thermomechanical conditions it is critical that the electrode termination is significantly thicker than that of any conventional metallized film capacitor. As measured by electrode resistivity the heavy edge needs to be one to two orders of magnitude lower than that of conventional metallized capacitors;

d. Internally "seriesed" capacitors with submicron-thick polymer dielectrics (typically, thickness of less than one micrometer); and/or e. A specific L/W shape to minimize ESR.

The fabrication of a single PMC with the use of the solutions outlined above yields a capacitor having superior performance and durability, in comparison with a metallized polypropylene capacitor of the related art, for example, when used under conditions typical for under-the-hood automotive applications.

It will be readily apparent to those skilled in this art that various changes and modifications of an obvious nature may be made, and all such changes and modifications are considered to fall within the scope of the present invention. Herein, the term "about" means a range of plus or minus 20% with respect to the specified value, more preferably plus or minus 10%, even more preferably plus or minus 5%, most preferably plus or minus 2%. In the alternative, as known in the art and recognized by a skilled artisan, the term "about" indicates a deviation, from the specified value, that is equal to half of a minimum increment of a measure available during the process of measurement of such value with a given measurement tool.

The invention as recited in claims appended to this disclosure is intended to be assessed in light of the disclosure as a whole. Various changes in the details, steps and components that have been described may be made by those skilled in the art within the principles and scope of the invention.

The invention claimed is:

1. A self-healing metallized polymer capacitor formed in the vacuum, the capacitor comprising:
non-thermoplastic polymer dielectric layers stacked with metallized electrodes to form a non-wound layer stack devoid of air gaps between constituent layers, at least one of said metallized electrodes having:
a first electrode portion with a first thickness limited by first and second surfaces of the at least one of said metallized electrodes,
wherein the first electrode portion is located with said first thickness extending throughout an active capacitor area and laminated between and in contact with a first surface of a first polymer dielectric layer and a second surface of a second polymer dielectric layer of said polymer dielectric layers of the layer stack, and
a second electrode portion with a second thickness limited by a third surface of the at least one of said metallized electrodes and the second surface of the at least one of said metallized electrodes, the second thickness being greater than the first thickness to increase mechanical strength of a capacitor's termination,
wherein said second electrode portion is located with said second thickness present
(i) between the first and second polymer dielectric layers such that:
the third surface of the at least one of said metallized electrodes is in direct physical contact with the first surface of the first polymer dielectric layer along said second electrode portion, and
the second surface of the at least one of said metallized electrode is in direct physical contact with the second surface of the second polymer dielectric layer along said second electrode portion, and
(ii) outside the first and second polymer dielectric layers such that at least one of the third surface and the second surface of the at least one of said metallized electrode is in contact, along the second electrode portion, with a material different from a material of the first and second polymer dielectric layers,
wherein said second electrode portion has a sheet resistance that is lower than that of the first electrode portion to minimize electrical resistivity of the capacitor's termination and to increase reliability of a high-current contact provided by such termination.

2. The capacitor of claim 1, wherein a material of a polymer dielectric layer of said layer stack has a chemical structure with a hydrogen-to-carbon ratio of at least 1.0 and an oxygen-to-carbon ratio of at least 0.1.

3. The capacitor of claim 1, wherein a material of a polymer dielectric layer of said layer stack has a glass transition temperature greater than 100° C.

4. The capacitor of claim 1, wherein the first electrode portion in the active area has a sheet resistance value between 10 Ohm/square and 100 Ohm/square.

5. The capacitor of claim 1, characterized by a dissipation factor that is smaller than 0.02 at 100° C.

6. The capacitor of claim 1, comprising two or more internal electrical connections configured in series.

7. The capacitor of claim 1, wherein said capacitor has a prismatic shape with transverse dimensions L, W, and H, wherein L represents a first extent of the capacitor along which the capacitor is equipped with said electrical termination layer, W represents a second extent of the capacitor, and H represents a third extent of the capacitor in a direction in which said polymer dielectric layers and said metallized electrodes are stacked, and wherein the ratio of said first extent to said second extent is greater than 1.

8. The capacitor of claim 7, wherein said ratio is greater than 2.

9. An article of manufacture that includes the capacitor of claim 1.

10. A high-voltage self-healing metallized polymer capacitor formed in the vacuum, the capacitor comprising:
   multiple internal sections of the capacitor, said sections electrically-connected in series; and
   metallized electrodes in each of the multiple internal sections;
   wherein at least one of said metallized electrodes has
   (A) a first electrode portion having a first thickness limited by first and second surfaces of the at least one of said metallized electrodes,
      wherein the first electrode portion is located with said first thickness extending throughout an active capacitor area and laminated between and in contact with a first surface of a first non-thermoplastic polymer dielectric layer and a second surface of a second non-thermoplastic polymer dielectric layer of said capacitor, and
   (B) a second electrode portion having a second thickness limited by a third surface of the at least one of said metallized electrodes and the second surface of the at least one of said metallized electrodes, the second thickness being greater than the first thickness to increase mechanical strength of a capacitor's termination,
   wherein said second electrode portion is located with said second thickness present
      (i) between the first and second polymer dielectric layers such that
         the third surface of the at least one of said metallized electrodes is in direct physical contact with the first surface of the first non-thermoplastic polymer dielectric layer along said second electrode portion, and
         the second surface of the at least one of said metallized electrode is in direct physical contact with the second surface of the second non-thermoplastic polymer dielectric layer along said second electrode portion, and
      (ii) outside the first and second non-thermoplastic polymer dielectric layers such each of the third surface and the second surface of the at least one of said metallized electrode is in contact, along the second electrode portion, with a material different from a material of the first and second non-thermoplastic polymer dielectric layers,
   wherein adjacent non-thermoplastic polymer dielectric layers of the capacitor alternate with said metallized electrodes to form a non-wound stack of layers devoid of air gaps between constituent layers of the stack.

11. An article of manufacture that includes the capacitor of claim 10.

* * * * *